Patented Oct. 20, 1936

2,057,695

UNITED STATES PATENT OFFICE 2,057,695

METHOD FOR THE PRODUCTION OF VEGETABLE PHOSPHATIDE PREPARATIONS

Albert Schwieger, Hamburg, Germany, assignor, by mesne assignments, to American Lecithin Company, Cleveland, Ohio, a corporation of Ohio No Drawing. Application June 28, 1934, Serial No. 732,923. In Germany December 13, 1933

8 Claims. (Cl. 99—15)

It has already been proposed to free phosphatides from their associated oil components and to dry the phosphatides after adding a foreign fat to them. Also aqueous oil-containing phosphatide-emulsions have been inspissated in vacuum and dried.

The present invention concerns a process for the production of products of vegetable phosphatides which is characterized by the fact, that the raw phosphatide is freed from fatty materials with a suitable solvent, whereupon the oil-freed phosphatide still containing a residue of solvent material is provided with an addition of water, the residue of solvent material removed and finally the remaining aqueous phosphatide emulsion further dried or otherwise preserved in a suitable manner.

In the removal of the solvent according to a particular embodiment of the invention the simultaneous evaporation of the proportion of water is made good by the introduction of water.

The raw phosphatide can also preferably be emulsified with a large proportion of water, for example a 20 to 50 fold proportion of water, to a thin dispersion, and this can be inspissated in vacuum, preferably in a revolving evaporator, advantageously to a content of about 5 to 20% phosphatide and about 95 to 80% of water. The drying of the aqueous phosphatide emulsion is preferably effected immediately after its production. According to a particular embodiment the drying of the phosphatide emulsion is effected by spraying into a heated air stream or upon roller driers in vacuo. Advantageously, the phosphatide emulsions are provided with additions of aqueous solutions or suspensions of carrier materials such as varieties of sugar, sugar syrup, albumen, starch and their breakdown products, cereal meal, cocoa powder or the like or of materials suitable for technical purposes such as gas black, sulphur, talcum and the like.

The oil-freed phosphatide according to a particular embodiment of the present invention may also be dried in aqueous emulsion with carbohydrates such as saccharose, maltose and lactose or sorbite ($C_6H_{14}O_6$), mannite ($C_6H_{14}O_6$) and the like, and the mixture dried by spraying or the like.

According to a particular embodiment the aqueous phosphatide emulsion is provided with an addition of malt extract and the mixture dried, the malt extract being preferably so proportioned that the product shows a dried malt content of about 40 to 45%.

Oil-containing lecithin has already been mixed with oil and sugar materials to a stable emulsion to which also gelatine has been added as a protective colloid. Also it is known that on heating a mixture of glycerine and lecithin an addition product in the form of a glassy mass is obtained.

The object of the invention is differentiated from these known processes in that the oil-freed phosphatide is admixed with carbohydrates such as saccharose, or the like, and the mixture dried.

*Example 1.*—100 kgs. of an aqueous raw phosphatide emulsion which, for example, is obtained as soya sludge by the precipitation of the phosphatide from raw soya-oil with the aid of condensing steam and which has a phosphatide content of 20%, is by treatment with acetone wholly or partially freed from water and freed practically completely from its fatty materials. The acetone treatment can be so conducted in accordance with the existing requirements that the phosphatide only contains very small traces of fat. For many purposes a threefold or fivefold acetone treatment with 80 kgs. of acetone is sufficient. For the rest, the solvent material is poured off from the bottom layer which consists of phosphatide and the oil-freed phosphatide which still contains about 30% of acetone is converted by kneading with 120 kgs. of water with addition of 0.5 kgs. of 5% aqueous ammonia solution at a temperature of 25° C. into a hydrated swollen condition.

It is important for the carrying out of the present invention, that the oil-freed phosphatide still contains a residue of solvent material, since the oil-freed phosphatide still moist with solvent swells relatively easily in water and is readily emulsified, whereas, as is known, dried oil-freed vegetable phosphatide can only be emulsified with water with the greatest difficulty. The aqueous acetone-containing emulsion is treated at a temperature below 50° C. under reduced pressure for removal of the solvent material. Since, corresponding to the partial pressure, a water evaporation is also effected, the evaporated proportion of water is replaced by addition of water in order that the emulsion shall remain at a suitable consistency which alone renders possible a complete evaporation of the solvent material.

In this manner 50 kgs. of an aqueous emulsion is obtained which shows a phosphatide content of about 50% and is freed from the greater part of the bitter materials, colouring materials and other undesired associated materials which are removed with the acetone and by the steam distillation.

To remove the last traces of the acetone and for further deodorization, the pasty aqueous phosphatide obtained is emulsified with a 20 to 50 fold proportion of water, for example with 700 litres of water to a thin milky phosphatide dispersion. This emulsion is treated in vacuo preferably in a rotary evaporator which shows, besides the necessary large surface for the evaporation, also the thermal conditions requisite for the conservation of the material. A sufficient deodorization is obtained after the evaporation of the material to about 200 to 220 litres, whereon the product contains approximately 10% of phosphatide and 90% of water.

In order to obtain an undecomposed finished product, it is necessary to treat the emulsion immediately. The aqueous phosphatide emulsion can either be rendered stable by addition of a suitable preserving agent such for example as salicylic acid, benzoic acid or their salts, glycerine, alkali, soap, phenols or the like or by sterilization by heat.

According to a particularly favourable embodiment of this process the aqueous phosphatide emulsion is dried by spraying into a hot air stream, preferably according to the Krause process. In this manner about 21.5 kgs. of a pulverulent product is obtained which has a phosphatide content of 90 to 95%.

*Example 2.*—100 kgs. of dried raw phosphatide which is obtained after drying of aqueous soya-phosphatide emulsion with a content of about 60% of phosphatide and 40% of soya oil is dissolved with heating in 500 grams of acetic ester, and then for example cooled to 0° C. As a result of this, the phosphatide precipitates. The oil containing acetic ester is run off from the bottom layer and the same treatment repeated three or more times in dependence upon the desired degree of freedom from oil.

In this manner about 99 kgs. of a paste is obtained which contains about 57 kgs. of phosphatide, about 2 kgs. of soya oil and other associated materials, and about 40 kgs. of acetic ester. The undesired flavouring materials, the bitter materials and the colouring materials are removed in great part by the treatment with acetic ester. This paste is then, preferably, with gentle warming, hydrated by kneading or stirring with 220 kgs. of water and the aqueous emulsion treated at low temperature in vacuo in order to remove the acetic ester residue. In this way, at a given temperature, an azeotropic mixture of acetic ester and water vapour passes over and it is preferable to replace the water evaporated in the course of the distillation or to employ previously a large proportion of water in order that the material treated retains its suitable consistency and is not converted into a waxy condition which hinders the complete removal of the acetic ester.

In order to remove the last traces of acetic ester and a considerable proportion of the flavouring materials volatile with steam, the aqueous phophatide emulsion remaining behind is converted into an aqueous dispersion by stirring with about 2000 litres of water, the emulsion formed being then inspissated in a rotary evaporator under low pressure to a phosphatide content of about 10%. This thin liquid emulsion is then provided with an addition of 45 kgs. of starch syrup with a content of 36 kgs. dextrose calculated on the dried substance, and the mixture dried by spraying for example according to the Krause process.

About 95 kgs. of a dried powder is obtained which contains about 60% of phosphatide which is practically oil-free, is characterized by a considerable stability and satisfies high requirements, so that it is suitable without further treatment for human foodstuffs. As compared with the hitherto known phosphatide products, it is characterized by a particularly pleasant flavour. The phosphatide powder does not stick to the palate and is readily and completely soluble in water and other liquids. Whereas phosphatides with a large oil-content mixed with powder-form carrier materials are sticky after drying, the products according to the present invention have lost their sticky character.

The powder-form permits of ready proportioning and of ready and complete admixture with other liquid, pasty or pulverulent materials. In place of starch syrup other kinds of sugar, for example raw sugar or other polysaccharides, for example starch or the like albumen, cocoa-powder or the like, may be combined with the phosphatides according to the invention to form practically oil-free, dry and pulverulent mixtures. The products may have a phosphatide content of for example 50%.

If the phosphatide products are to be employed for technical purposes then as carrier materials also other pulverulent substances such as gas black, sulphur, talcum or the like can be added to the aqueous emulsion and dried, as for example when phosphatides are to be employed for the production of rubber mixtures. Also mixtures with meal, for example with wheat meal, soya meal, rye-meal and the like can be obtained in powder form according to the present invention, and employed with advantage for baking purposes or for the production of nutrient materials or the like.

*Example 3.*—100 kgs. of aqueous raw phosphatide emulsion is converted into an aqueous oil-free and solvent material-free phosphatide emulsion in the manner of Example 1. To the evaporated emulsion 30 kgs. of a malt extract with 16 kgs. of dry malt content is added and the whole intimately admixed and thereupon dried by spraying into a heated air stream in accordance with the Krause process.

About 40 kgs. of a pulverulent product is obtained with a content of 60% vegetable phosphatide. The product readily dissolves in water, it does not stick to the mouth, and it has a new pleasant flavour which is supposedly to be ascribed to the fact that the known lecithin flavour is wholly suppressed and on the other hand also a moderation of the sweetness of the malt is effected. These properties are of the greatest importance for the use of the powder in large quantities for therapeutic and dietetic purposes. Although attempts have been made to obtain such products with the lecithin content as high as possible, it has been found, that it is preferable, that the lecithin content in products which are for nutrient purposes should not be increased above 55 to 60%. Also in the present case a definite concentration ratio has to be maintained since with high lecithin contents the protective action of the malt extract fails and in the hot air stream spraying drying, probably as a result of the large surface, a partial oxidation of the vegetable phosphatide results, whereby the flavour of the product is disadvantageously influenced.

It is already well known to obtain in this manner dry egg yolk in powder form in which the total egg oil and vitellin is contained. It was, however, not possible to obtain a powder by the spray drying from the aqueous vegetable phosphatide emulsions which have been obtained from the raw oil by precipitation. The product obtained was usually soft and sticky so that it rendered the apparatus entirely unusable. Only according to the present invention it is possible to obtain pulverulent oil-free phosphatides. If oil-free vegetable phosphatides are to be obtained in pulverulent form then an addition of large proportions of carrier materials is necessary which, however, considerably reduces the phosphatide content of the product.

The new phosphatide malt powder product is particularly appetizing. As a result of its fat-free condition it does not produce a sensation of fullness so that it can be consumed in large quantities.

A further advantage of the product according to the present invention is to be found in that it is rich in diastase which is derived from the malt extract, and this, as has been found, is retained in the spray drying. The colloidal character of the product is practically in no way altered to which it owes its ready water-solubility and capacity for emulsification.

The product is also advantageously useful as a baking assistant, in which connection the lecithin operates upon the gluten substance of the baking meal and the diastase serves for the breaking down of the starch to sugar and so on, and thus for the development of yeast in a particularly favourable manner.

*Example 4.*—50 kgs. of dried raw phosphatide with a content of 60% phosphatide and about 40% soya oil is worked up in accordance with Example 2 to an aqueous, practically oil-free phosphatide emulsion, and is stirred with 1000 litres of water to an aqueous dispersion which is inspissated to a rotary evaporator under reduced pressure to a volume of about 500 litres. The aqueous emulsion obtained is mixed with about 15 kgs. of sorbite and the mixture dried by spraying or on rolls.

A product is obtained with a lecithin content of about 55 to 60% which has a high nutrient value and is particularly suitable as a foodstuff for diabetic subjects. It shows a considerable water-solubility and a high resorption capacity, so that it is particularly readily digestible. Since sorbite, as is known, is a glycogen former and glycogen and phosphatide are stored in the human body, its nutrient value in the case of sugar disorders is important. The invention is not limited to the embodiment described. By reason of the pulverulent form a ready proportioning and an easy solubility is attained. It is surprising that the products in spite of the large surface, which is the result of the pulverulent condition and the removal of the oil component, are practically stable.

I claim:

1. Process for the production of vegetable phosphatide products which includes the steps of adding a fat solvent to raw vegetable phosphatide, removing the fatty constituent of said phosphatide with the bulk of said solvent, emulsifying the residue of phosphatide and solvent in water, evaporating the remainder of the solvent and incorporating in said emulsion a carrier material in aqueous solution.

2. Process for the production of vegetable phosphatide products which includes the step of adding a fat solvent to raw vegetable phosphatide, removing the fatty constituent of said phosphatide with the bulk of said solvent, emulsifying the residue of phosphatide and solvent in water, evaporating the remainder of the solvent and adding to said emulsion an aqueous solution comprising at least one of the carbohydrate group consisting of saccharose, maltose, lactose, sorbite and mannite and drying the product to a pulverulent powder.

3. Process for the treatment of raw vegetable phosphatide, which consists in adding a fat solvent to said raw phosphatide, removing the fatty constituents of said raw phosphatide together with the bulk of said solvent, emulsifying the residue of phosphatide and solvent in water, evaporating the remainder of the solvent incorporating with said emulsion malt extract in such proportions that on drying the mixture the product contains more than 40% of malt.

4. Process for the production of vegetable phosphatide products, which includes the steps of adding a fat solvent to raw vegetable phosphatide, removing the fatty constituents of said phosphatide with the bulk of said solvent, emulsifying the residue of phosphatide and solvent in water, evaporating the remainder of the solvent and incorporating in said aqueous emulsion of phosphatides a carrier material and evaporating the water.

5. Process for the production of vegetable phosphatide products which includes the steps of adding a fat solvent to raw vegetable phosphatide, removing the fatty constituent of said phosphatide with the bulk of said solvent, emulsifying the residue of phosphatide and solvent in water, evaporating the remainder of the solvent, and incorporating in said emulsion a carrier material in aqueous emulsion.

6. Process for the production of vegetable phosphatide products which includes the steps of adding a fat solvent to raw vegetable phosphatide, removing the fatty constituent of said phosphatide with the bulk of said solvent, emulsifying the residue of phosphatide and solvent in water, evaporating the remainder of the solvent, and incorporating in said emulsion a carrier material in aqueous suspension.

7. Process for the production of vegetable phosphatide products which includes the step of adding a fat solvent to raw vegetable phosphatide, removing the fatty constituent of said phosphatide with the bulk of said solvent, emulsifying the residue of phosphatide and solvent in water and adding to said emulsion an aqueous suspension of gas black.

8. Process for the production of vegetable phosphatide products which includes the step of adding a fat solvent to raw vegetable phosphatide, removing the fatty constituent of said phosphatide with the bulk of said solvent, emulsifying the residue of phosphatide and solvent in water and adding to said emulsion an aqueous suspension of sulphur.

ALBERT SCHWIEGER.